United States Patent
Johri et al.

(10) Patent No.: US 10,976,946 B2
(45) Date of Patent: Apr. 13, 2021

(54) METHOD AND COMPUTER SYSTEM FOR MANAGING BLOCKS

(71) Applicant: HITACHI, LTD., Tokyo (JP)

(72) Inventors: Abhishek Johri, Tokyo (JP); Mitsuo Hayasaka, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 15/749,024

(22) PCT Filed: Nov. 27, 2015

(86) PCT No.: PCT/JP2015/005914
§ 371 (c)(1),
(2) Date: Jan. 30, 2018

(87) PCT Pub. No.: WO2017/090071
PCT Pub. Date: Jun. 1, 2017

(65) Prior Publication Data
US 2019/0004703 A1   Jan. 3, 2019

(51) Int. Cl.
*G06F 3/06* (2006.01)
*G06F 12/02* (2006.01)
*G06F 16/17* (2019.01)

(52) U.S. Cl.
CPC .............. *G06F 3/064* (2013.01); *G06F 3/061* (2013.01); *G06F 3/067* (2013.01); *G06F 3/0608* (2013.01); *G06F 3/0644* (2013.01); *G06F 3/0689* (2013.01); *G06F 12/023* (2013.01); *G06F 16/1727* (2019.01)

(58) Field of Classification Search
CPC ........ G06F 3/064; G06F 3/0608; G06F 3/061; G06F 3/0644; G06F 3/067; G06F 3/0689; G06F 16/00; G06F 12/023
See application file for complete search history.

(56) References Cited

U.S. PATENT DOCUMENTS

| | | | |
|---|---|---|---|
| 6,732,124 B1 * | 5/2004 | Koseki | G06F 11/1435 |
| 7,437,528 B1 * | 10/2008 | Moore | G06F 3/0608 |
| | | | 711/170 |
| 7,599,972 B2 | 10/2009 | Dodge et al. | |
| 7,827,201 B1 * | 11/2010 | Gordon | G06F 3/0607 |
| | | | 707/792 |
| 8,812,450 B1 | 8/2014 | Kesavan et al. | |

(Continued)

FOREIGN PATENT DOCUMENTS

EP   1895394 A2   3/2008

OTHER PUBLICATIONS

International Search Report for PCT/JP2015/005914, dated Jul. 6, 2016.

*Primary Examiner* — David Yi
*Assistant Examiner* — Tahilba O Puche
(74) *Attorney, Agent, or Firm* — Volpe Koenig

(57) ABSTRACT

A computer system (e.g. a file system) for managing blocks, comprises a memory unit including a memory and a processing unit including a processor and coupled to the memory unit. The memory unit is configured to store metadata of data including objects. The metadata points to blocks storing the objects in a storage unit including multiple different sized blocks. The processing unit is configured to, for at least one of the objects, determine different sized blocks for storing the object, from among free blocks in the multiple different sized blocks of the storage unit.

15 Claims, 13 Drawing Sheets

(56) References Cited

U.S. PATENT DOCUMENTS

| | | | |
|---|---|---|---|
| 9,384,201 B2* | 7/2016 | Hwang | G06F 16/13 |
| 9,519,426 B2* | 12/2016 | Iyengar | G06F 12/02 |
| 9,542,401 B1* | 1/2017 | Veeraswamy | G06F 16/128 |
| 9,779,015 B1* | 10/2017 | Oikarinen | G06F 12/02 |
| 2002/0161911 A1* | 10/2002 | Pinckney, III | H04N 21/23113 709/231 |
| 2006/0010301 A1* | 1/2006 | Yagawa | G06F 21/64 711/163 |
| 2008/0052329 A1* | 2/2008 | Dodge | G06F 3/0613 |
| 2014/0344507 A1* | 11/2014 | Piggin | G06F 3/0643 711/103 |
| 2015/0095383 A1* | 4/2015 | Zhai | G06F 3/0608 707/823 |
| 2016/0026579 A1* | 1/2016 | Samanta | G06F 12/123 711/136 |

* cited by examiner

FIG. 8

| OBJECT CATEGORY | OBJECT EXTENSION | OBJECT SIZE | BLOCK SIZE | |
| --- | --- | --- | --- | --- |
| | | | HEADER | BODY |
| AUDIO FILE | .MP3 | <= 100 KB | 4 KB | 16 KB |
| | .MP3 | > 100 KB | 4 KB | MAX FIT |
| | .WMA | -- | 4 KB | 16 KB |
| | ... | ... | ... | ... |
| VIDEO FILE | .MP4 | -- | 4 KB | 64 KB |
| | .MOV | -- | 8 KB | 64 KB |
| | ... | ... | ... | ... |
| PICTURE FILE | .JPEG | -- | MAX FIT | MAX FIT |
| | .RAW | -- | 4 KB | MAX FIT |
| | ... | ... | ... | ... |
| TEXT DOCUMENT | .TXT | -- | MIN FIT | MIN FIT |
| | .DOC | -- | 4 KB | 16 KB |
| | ... | ... | ... | ... |
| BLOCK STORAGE VOLUME | -- | -- | MAX FIT | MAX FIT |
| ... | ... | ... | ... | ... |

METHOD AND COMPUTER SYSTEM FOR MANAGING BLOCKS

TECHNICAL FIELD

The present invention generally relates to a technology for managing blocks.

BACKGROUND ART

In a computer system such as a file system, a block size is generally fixed. For example, according to PTL1, a block size is fixed for each file based on file type thereof.

CITATION LIST

Patent Literature

[PTL1] U.S. Pat. No. 7,599,972

SUMMARY OF INVENTION

Technical Problem

A block size might be small or large for at least a part of an object such as a file because the block size of the object is fixed.

Small sized blocks may require huge amount of metadata to manage the blocks. The huge amount of metadata may not be able to fit (be stored) in a memory such as a cache memory. In other words, the computer system may have to store parts of the metadata in a slower storage device such as a HDD (Hard Disk Drive). This slows down the system performance because the operating system in the computer system may need to access the slower storage device for reading the parts of the metadata of an object being accessed (read).

On the other hand, large sized blocks may result in inefficient use of storage space (storage device) because of potential more unused space per block.

Solution to Problem

A computer system (e.g. a file system) for managing blocks, comprises a memory unit including a memory and a processing unit including a processor and coupled to the memory unit. The memory unit is configured to store metadata of data including objects. The metadata points to blocks storing the objects in a storage unit including multiple different sized blocks. The processing unit is configured to, for at least one of the objects, determine different sized blocks for storing the object, from among free blocks in the multiple different sized blocks of the storage unit.

Advantageous Effects of Invention

The present invention allows the computer system to determine different sized blocks for each object while keeping the amount of required metadata less.

BRIEF DESCRIPTION OF DRAWINGS

FIG. 8 shows an example of a block size recommendation table 230.

DESCRIPTION OF EMBODIMENTS

Figure 1:
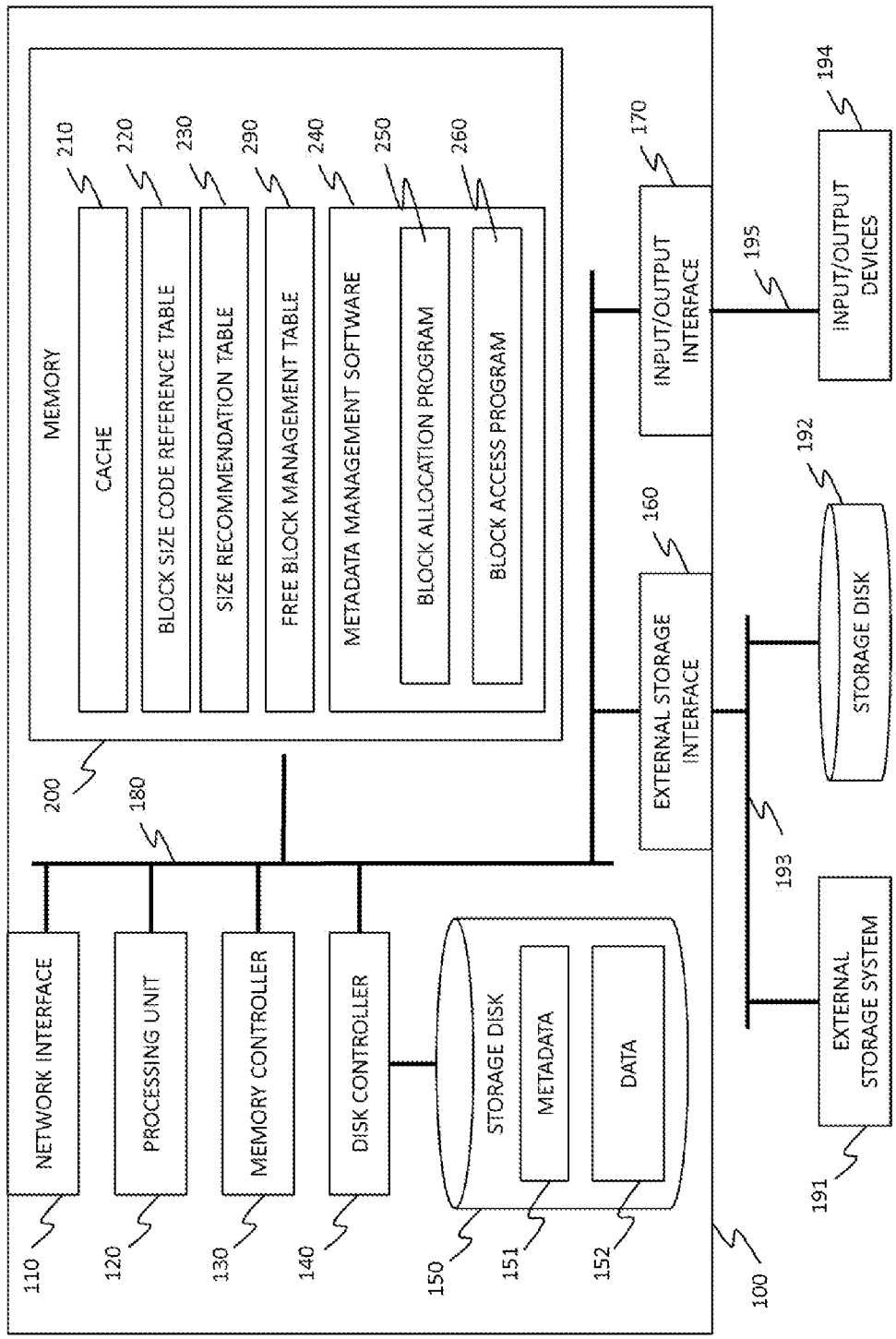
FIG. 1 is a schematic block diagram of a computer system according to the first embodiment.

Embodiments of the present invention are described below with reference to the accompanying drawings. The embodiments to be described below, however shall not limit the present invention according to the claims. All combinations of features described in the embodiments are not always essential as means of the solutions stated in the present invention. Though the embodiments are explained in enough detail for those skilled in the art to practice the present invention, it must be understood that other implementations and embodiments are also possible and that it is possible to change the configuration and the structure and to replace various components within the spirit and scope of the technical idea of the present invention. Therefore, the description below must not be interpreted limited to these embodiments.

It should be noted that, though the information used by the present invention is explained with tables, lists, and bitmaps as examples in the figures of this description, the information is not limited to the information provided in the structures described in the embodiments, the information which does not depend on the data structure may also be permitted.

In the explanation below, the processing might be explained by a "program" as a subject, but the subject of the explanation may also be processor because the program performs the specified processing by being performed by the processor while using a memory and a communication port (a communication control device). Furthermore, the processing which is disclosed with a program as the subject may also be considered to be the processing performed by a computer and an information processing device such as a management server. A part or all of the programs may be realized by dedicated hardware or may also be modularized. Various types of programs may also be installed in the respective computers by a program distribution server or storage media.

1. Summary of the Embodiments

As described above, a block size is generally fixed, for example, for each file of a file system (PTL1).

A computer system (e.g. a file system) with small sized blocks (typically storage data blocks for storing data elements) may result in huge amount of metadata (required to manage the data blocks). Huge amount of metadata may not be able to fit entirely in the cache memory. This slows down the system performance because the operating system may need to access slower storage device (e.g. HDD) for reading at least parts of metadata of an object (typically a file in a file system) being accessed. On the other hand, large sized blocks may result in inefficient use of storage space because of potential more unused space per block. A moderate sized data blocks may generate lesser amount of metadata if compared to small sized blocks but still not be able to fit entirely/mostly in metadata cache memory without sacrificing the storage space usage efficiency.

In order to solve the problem, a computer system according to at least one embodiment performs metadata management using block size information in order to allocate different sized blocks for each object managed by the computer system.

Figure 7:
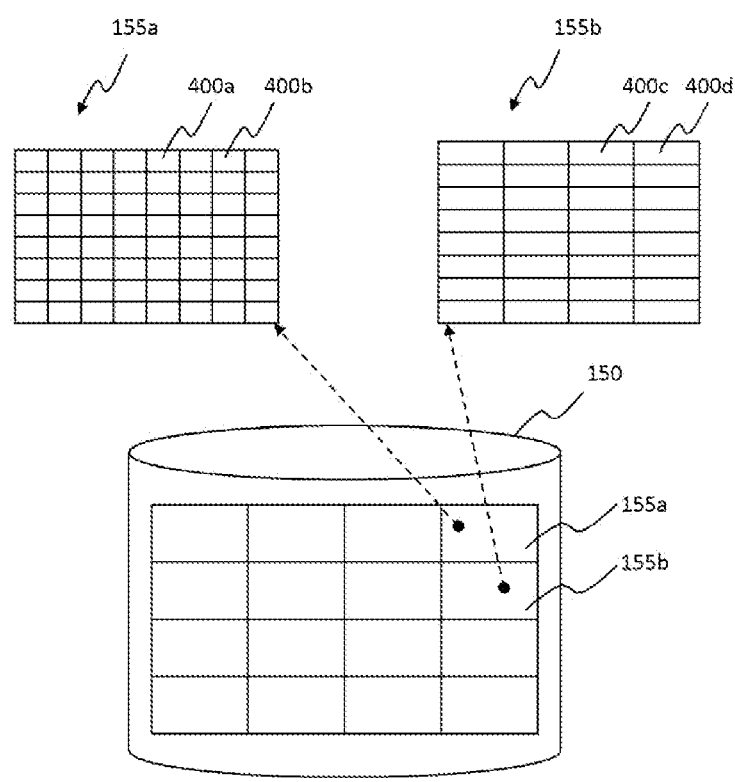
FIG. 7 is a schematic diagram to illustrate blocks allocation layout on storage disk 150.

Specifically, a storage space managed by the computer system consists of different sized blocks (e.g., see FIG. 7). Metadata of data (which is objects such as files) includes the block size information corresponding to block pointers (e.g., see FIG. 3). The block size information (e.g., see FIG. 10) represents sizes of blocks which the block pointers respectively point to. The computer system can access a target block storing target data element by referring to a block pointer which points to an address of the target block, on the basis of the block size information.

More specifically, for example, the computer system includes a memory unit including at least one memory (e.g. a low access latency memory) and a processing unit including at least one processor and coupled to the memory unit. The memory unit temporarily caches parts of data, metadata of the data, programs to be executed by the processor, etc. The programs include an OS (Operating System) and a FS (File system program) which is an example of block management software. The processing unit provides a storage space comprising different sized blocks, by executing the FS. At least a part of the storage space may be based on at least a part of a storage unit including at least one non-volatile data storage device (e.g. a HDD or a SSD (Solid State Drive)). The computer system may include at least one non-volatile data storage device. The computer system may include an interface unit including at least one of an optional network interface, an input/output interface and an external storage interface.

The FS may include at least one of a block allocation program, a block access program, and other relevant programs. The FS according to at least one embodiment supports allocation and management of a plurality of blocks where the allocated blocks may differ in size. According to at least one embodiment, the plurality of blocks allocated to store a single object (e.g. a file) may also differ in size. For example, if the FS supports block sizes which are 4 KB, 16 KB, 64 KB, and 128 KB, 200 KB of a file may be stored in any one of the following combination (A) to (C) of the supported blocks, for example.
(A) fifty 4 KB-blocks. ("xKB-block" means x KB of a block ("x" is a numerical value which is 0 or larger.))
(B) ten 4 KB-blocks and ten 16 KB-blocks.
(C) one 128 KB-block, one 64 KB-block, and two 4 KB-blocks.

The computer system manages the block allocation and management of blocks that vary in size. The FS stores block pointers in a predefined data structure such as a tree, to manage block allocation and management. Furthermore, block size codes are respectively associated with the block pointers. Each of the block size codes represents a block size pointed to by the corresponding block pointer. With encoding it is possible to store a multiple block sizes in small area rather than storing the size of the block as is. If the FS supports, for example, 4 block sizes which are 4 KB, 16 KB, 64 KB, and 128 KB, each of the block size codes can be of 2 bits, where each combination of the 2 bits represents one of the 4 block sizes.

The computer system decides on appropriate block sizes, to allocate varying sizes of the determined blocks, and to access varying sizes of the pre-allocated blocks.

According to the embodiments, it is possible to allocate blocks of varying sizes even for each object (e.g. each file). This allows for flexibility in allocation of blocks so that small block size can be used for head of an object, larger block sizes can be used for most part of the object, and a small block size can be used for tail of an object so that unused space can be minimized. This results in efficient use of storage space while keeping the amount of required metadata less. Less amount of metadata will help to keep most or all of the metadata in faster but costly memory (e.g. DRAM), so that reading the storage disk for accessing metadata can be avoided or minimized. This helps to improve the performance of the computer system.

The embodiments will be described in detail below.

2. First Embodiment

FIG. 1 is a block diagram of the hardware configuration of a computer system 100 according to an embodiment of the present invention.

The computer system 100 comprises a network interface 110, a processing unit 120, a memory controller 130, a disk controller 140, a storage disk 150, an external storage interface 160, an input/output interface 170, an internal network bus 180, and a memory 200. The processing unit 120 is coupled to the components (110, 130, 140, 150, 160, 170, and 200) via the internal network bus 180.

The computer system 100 may include a plurality of each of the above mentioned components (110, 120, 130, 140, 150, 160, 170, 180, and 200), however for the sake of simplicity only one item of each component is shown in the FIG. 1.

The network interface 110 is an interface to connect the computer system 100 with to a network of other computer devices (e.g. host computer). By using the network interface 110 and the network, the computer system 100 is able to communicate with other computer devices to transfer data and command. If using an appropriate network interface 110, any network that can perform data communication can be used, such as a SAN (Storage Area Network), LAN (Local Area Network), Internet, leased line, and public line, etc.

The processing unit 120 may include one or more general purpose processors, with one or more cores. The processing unit 120 may include a GPU (Graphics Processing Unit) or ASIC (Application Specific Integrated Circuit) in order to perform some specific tasks more efficiently and quickly. The processing unit 120 may also include its own local memory in order to be able access some information quickly. There can be plurality of processor unit 120 in the computer system 100.

The memory controller 130 is used by the processor unit 120 for accessing data to/from memory 200.

The disk controller 140 is used by the processor unit 120 for accessing data to/from storage disk 150.

The storage disk 150 is a secondary data storage device such as HDD or SSD and is an example of a storage unit. There can be plurality of the storage disk 150 in the computer system 100. The storage disk stores user data, an operating system, application programs, application data, disk management metadata, and other relevant data used for operation of the computer system 100. The storage unit may also be a logical device for example configured using multiple physical storage disks, and may also have RAID (Redundant Array of Independent (or Inexpensive) Disks) data protection. The storage unit may be a storage space based on at least one of internal storage devices or external storage devices. For example, The storage unit may be a logical volume.

As shown in the figure, the storage disk 150 can store data 152 including objects (e.g. files) and metadata 151 of the data. The metadata 151 represents blocks (locations) stored in an object for each object in the data 150. In this embodiment, it can be expected that the entire metadata 151 is stored in the memory 200 because it is possible to keep the amount of the metadata 151 less. However, at least a part of the metadata 151 can be stored in the storage disk as well as in the memory 200.

The external storage interface 160 is used to perform data transfer between the computer system 100 and one or more external storage devices, such as an external storage system 191 or an external storage disk 192. The external storage disk 192 may be similar to the storage disk 150 explained above.

The input/output interface 170 is an interface used for communication between the computer system 100 and the data input/output devices 194. The data input devices may be a keyboard and a pointing device (e.g. a computer mouse) and data output devices may be a display monitor.

The internal network bus 180 connects components of the computer system 100 with each other, according to the communication requirement.

The memory 200 is a low latency primary storage such as DRAM (Dynamic Random Access Memory). The memory 200 may include one or more modules of a primary storage. The memory 200 may include a cache memory region 210 to temporarily stores data that is under processing, or data that may be used for future reference. The cache memory region may also temporarily store metadata related to data block management, and other relevant information that may be required by the operating system or the application programs for their operation. The memory 200 may also store control information for communicating between multiple processing units 120. The control information may include configuration data related to the configuration of the computer system 100. In this embodiment, the memory 200 also stores control information such as a block size code reference table 220, a block size recommendation table 230, and a free block management table 290. A part of the memory 200 is used as program memory to store programs for execution by the processor unit 120. In this embodiment, metadata management software 240 (e.g. a file system program) is also stored in the memory 200. The metadata management software 240 may include a block allocation program 250, and a block access program 260, along with other relevant programs.

The computer system 100 may be a general purpose computer, or it may be a computer system for a specific purpose. For example, in at least one embodiment, the computer system 100 may be a block data storage system, a file data storage system, an object storage system, or a unified storage system. In each of the embodiments, the computer system may include additional components. The structure of the computer system 100 for the specific purpose may be modified by a skilled person, while keeping the essence of the present invention.

In general, block management software such as a file system uses a free space bitmap (hole map) to determine the allocation status of blocks of the storage disk 150. The free space bitmap keeps a bitmap (e.g. 1 bit per block) for all the blocks of the storage disk 150. For example, a bit of value "0" may represent that the corresponding block is free while the value "1" may represent that the block is allocated. Size of the free space bitmap can grow proportional to the size of storage disk 150.

In at least one embodiment, the free block management table 290 may be a bitmap. Since mix sized blocks may be allocated on storage disk 150, in at least one embodiment, the smallest size block is used for maintaining bitmap. For example, if the supported block sizes are 4 KB, 16 KB, 64 KB, and 128 KB, the bitmap is maintained considering all 4 KB-blocks in storage disk 150. Thus, for a single 16 KB-block, the bitmap keeps 4 bits (16 KB or 4 KB), for a 64 KB-block, the bitmap keeps 16 bits (64 KB or 4 KB).

Figure 2:
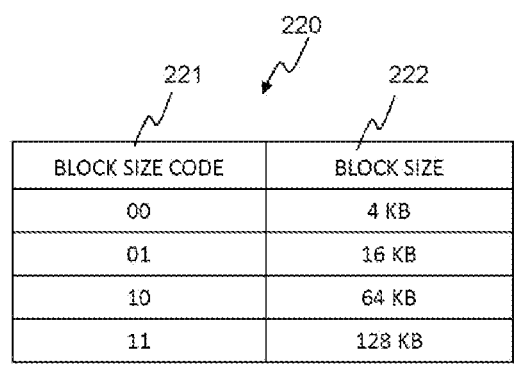
FIG. 2 shows an example of block size code reference table 220.

FIG. 2 shows an example of the block size code reference table 220.

The table 220 is used as a reference by the data block management related programs to determine the size of a block when its size is provided as a code. This table 220 includes records. Each of the records stores information including block size codes 221 and the meaning i.e. corresponding block size 222 for each code 221. In this example, the block size codes 221 are two bits wide and each of the four codes 221 possible combinations has been assigned a block size 222. As shown in the example, code "00" represents block size "4 KB", code "01" represents block size "16 KB", etc. The width of codes may not be limited to two bits, but the code bit width can be expanded (or contracted) to represent more bock sizes supported by the data block management software.

Further, some coding algorithm can be used to generate codes to represent block sizes. For example, Huffman coding can be used to assign the codes 221, where the assignment may be based on block size usage histogram analysis and, for example, more frequently used block size can use small sized Huffman code.

Figure 3:
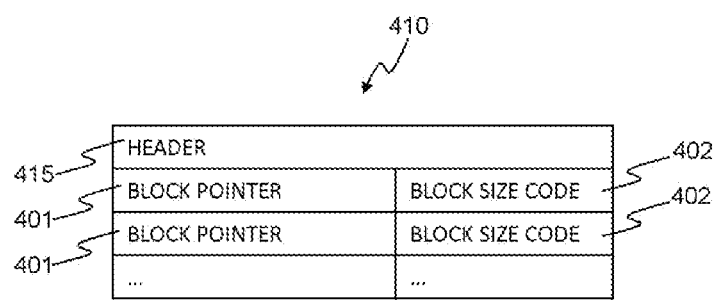
FIG. 3 shows an example structure of a direct node 410.

FIG. 3 shows an example structure of a direct node 410.

The direct node 410 consists of a header 415 and a list of block pointers 401 with their corresponding block size codes 402. The list of block pointers 401 are pointers (addresses) to the blocks where data is written. Each of the block size codes 402 is a code representing size of block which the corresponding block pointer is pointing to. The exact size of the block can be determined by referring to the table 220.

Figure 4:
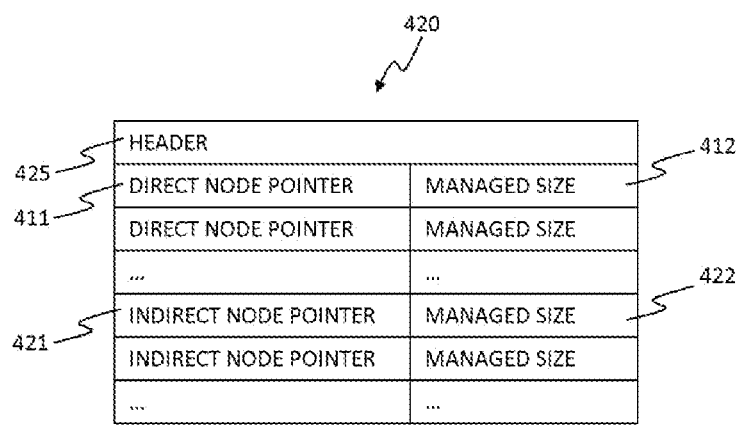
FIG. 4 shows an example structure of an indirect node 420.

FIG. 4 shows an example structure of an indirect node 420.

The indirect node 420 consists of a header 425, a list of direct node pointers 411 with their corresponding managed size 412, and a list of indirect node pointers 421 with their corresponding managed size 422. The direct node pointer

411 is a pointer (addresses) to data block where direct node is stored. The managed size 412 represents total block size which is addressed by all the block pointers of the related direct node 410. i.e. the direct node 410 pointed to by the corresponding direct node pointer 411.

Figure 5:
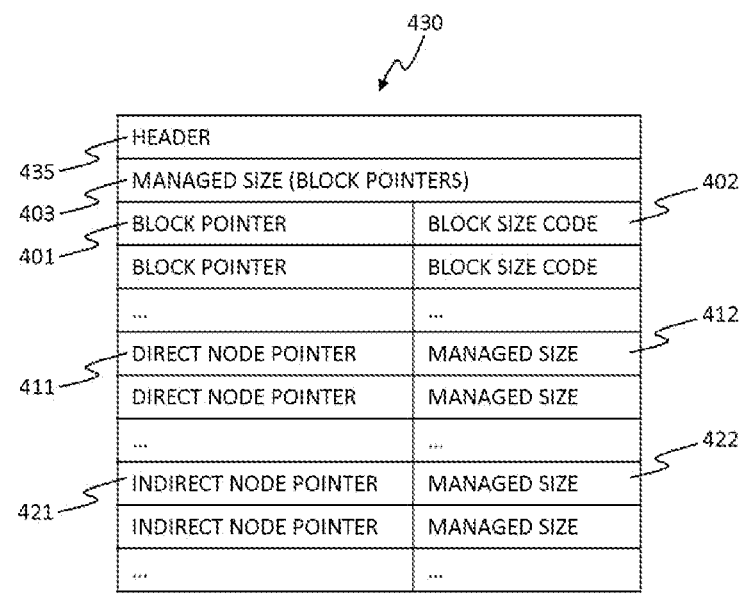
FIG. 5 shows an example structure of a root node 430.

FIG. 5 shows an example structure of a root node 430.

The root node 430 may be considered as analogous to Inode structure of UNIX style file systems. It consists of a header 435, a managed size 403, a list of block pointers 401 with their corresponding block size codes 402*a*, a list of direct node pointers 411 with their corresponding managed size 412, and a list of indirect node pointers 421 with their corresponding managed size 422.

The direct node 410, indirect node 420, and the root node 430 may have other relevant information (not mentioned in the FIGS. 3, 4 and 5 for the sake of simplicity), to successfully implement the tree data structure in the intended way. Example of such information can be CRC code for the node, length (size) of the node itself, tree depth where the node exists, a magic number to distinguish the node, a version number of the node, total size of data managed by the node, etc. This information may be present in the header of each node, or in the body of the node as required. Analogous to the Inode data structure of UNIX style file system, the root node may also hold information that may be common to the node tree or may be specific to the object to which the root node belongs, such as, ID of the object (or file), date and time of the moment when the object was last accessed or modified, etc. In this embodiment, the root node may also store type of the object (or file) for quick reference.

Figure 6:
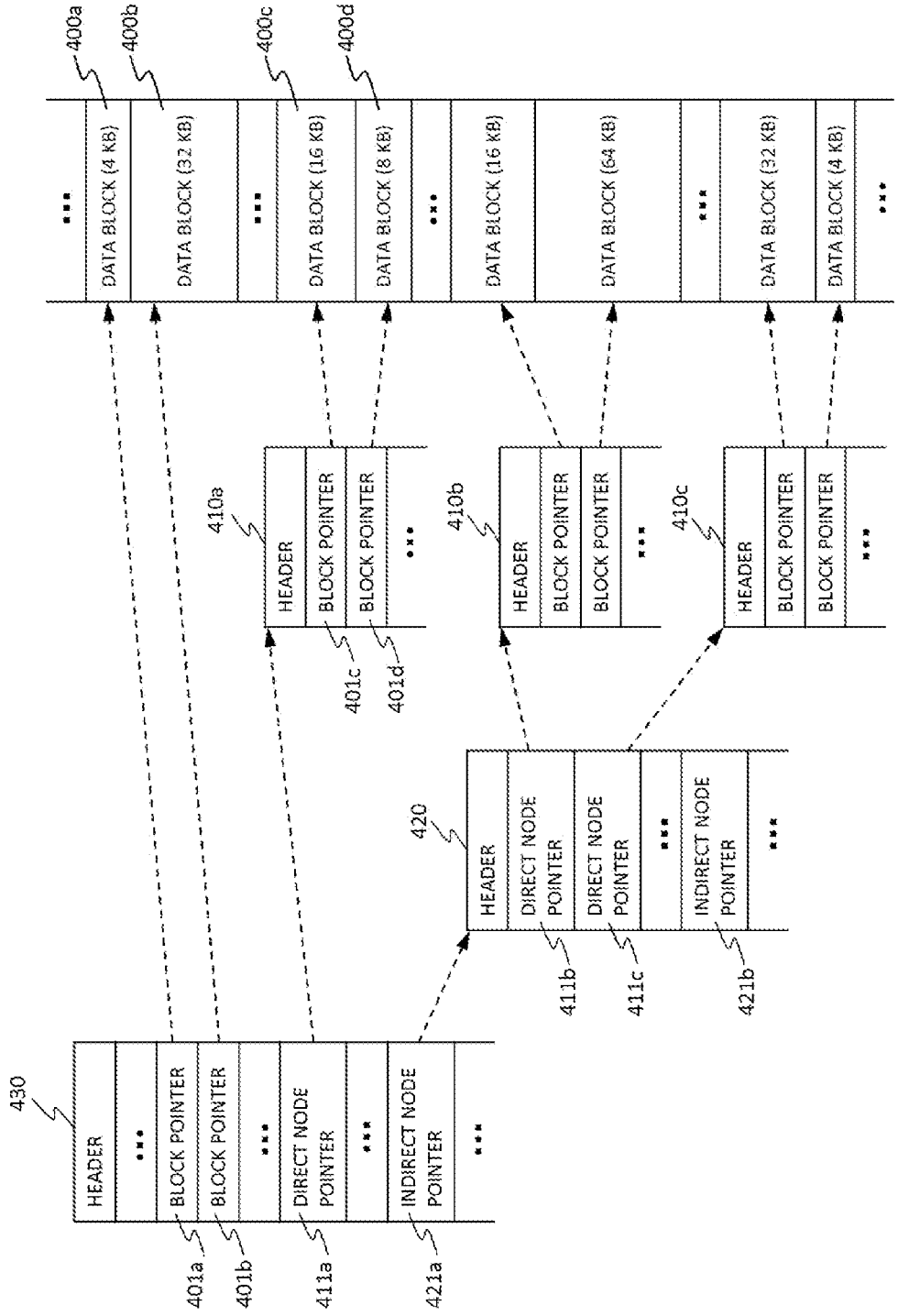
FIG. 6 is a schematic diagram of an example of node tree data structure.

FIG. 6 is a schematic diagram of an example of node tree data structure according to this embodiment.

This node tree data structure is an example of structure of metadata. In other words, metadata can include at least the root node of the root node, indirect nodes and direct nodes. This node tree data structure is used for addressing data blocks of an object. This node tree data structure can be analogous to Inode pointer tree structure of Inode of a UNIX style file system, such as an ext3 file system.

In this figure, for the sake of simplicity, the block size code 402 and the managed sizes (403, 412 and 422) are not shown.

As seen from the figure, the root node 430 stores block pointers 401*a* and 401*b*, a direct node pointer 411*a*, and an indirect node pointer 421*a*. The block pointers 401*a* and 401*b* are pointers to the data blocks 400*a* and 400*b* respectively. The direct node pointer 411*a* points to the direct node 410*a*. The indirect node pointer 421*a* points to the indirect node 420.

"Direct node" is a node which points to data blocks and does not point to any node. For example, the direct node 410*a* stores block pointers 401*c* and 401*d* that point to data blocks 400*c* and 400*d* respectively. Other direct nodes 410*b* and 410*c* can also be understood in similarly.

"Indirect node" is an intermediate node between direct nodes or other indirect nodes and other indirect nodes or the root node. That is, an indirect node points to at least one of direct nodes and other indirect nodes and the indirect node is pointed by one of other indirect nodes and the root node. For example, the indirect node 420 stores direct node pointers 411*b* and 411*c* that point to direct nodes 410*b* and 410*c* respectively. The indirect node 420 also stores an indirect node pointer 421*b* that points to an indirect node (not shown in this diagram).

As mentioned in the figure, the data blocks vary in size, yet each of them is pointed to by a single pointer. The size of each of the data block is coded and mentioned in the respective nodes (not shown in the figure) along with the corresponding block pointers.

FIG. 7 is a schematic diagram to illustrate blocks allocation layout on the storage disk 150.

In this embodiment, size of the allocated blocks may differ, and in order to manage the block allocation in efficient manner, the entire or partial storage disk may be divided into smaller sized storage areas, where each of the storage areas can only be used to allocate blocks of same size. As shown in the figure, the entire storage disk 150 is divided in smaller size storage areas 155*a*, 155*b*, etc. And the storage area 155*a* is used to store blocks 400*a*, 400*b*, etc. of same size, and the storage area 155*b* is used to store blocks 400*c*, 400*d*, etc. of same size but differ in size than the blocks of storage area 155*a*.

For example, each of the storage areas (155*a*, 155*b*) can be 42 MB in size, where the storage area 155*a* can only be used to allocate 4 KB-blocks (400*a* and 400*b*), and the storage area 155*b* can only be used to allocate 16 KB-blocks (400*c* and 400*d*). Each of the storage areas 155 can be of the same size or may differ in size.

In another embodiment, the storage disk 150 may not be divided in storage areas 155 but the entire disk can be used for anywhere allocation of blocks that differ in size.

FIG. 8 shows an example of the block size recommendation table 230.

The block allocation program 250 uses this table 230 to determine the recommended size of blocks for allocation for a particular kind of object. The block allocation program 250 tries to allocate blocks according to the recommendation but if the program 250 cannot find an empty block of recommended size or some other block allocation policy has higher priority, the program 250 may not allocate blocks according to the recommendation instead uses some other policy to decide on the size of blocks to be allocated.

This table 230 includes records. Each of the records stores information including object category 231, object extension 232, object size 233, and block size 234. The object category 231 represents the category of the object. The object extension 232 represents the extension of the object. The object size 233 represents the condition with respect to object size. The block size 234 represents recommended block sizes which respectively correspond to parts of the object. The parts of the object are, for example, the header and the body. Therefore the block size 234 includes header 235 representing the block size for the header of the object and body 236 representing the block size for the body of the object.

The recommended block sizes stored in this table 230 may be of any size that is supported by the computer system and are encoded using "block size code" as explained in FIG. 2.

The recommended block size "MAX FIT" is a strategy where the block size for allocation is chosen as the largest possible block which is smaller than the size (or unallocated remaining size) of the object. Except for the tail of the object, the smallest block is allocated. On the other hand, the recommended block size "MIN FIT" is a strategy where the block size for allocation is chosen as the smallest block size that is equal to or greater than the object (or unallocated remaining size of the object).

For example, consider a computer system that supports block sizes of 4 KB, 16 KB, 64 KB and 128 KB. For this computer system, consider an example audio file with extension of MP3 and size of 281 KB.

The table 230 mentions the recommended block sizes "4 KB" for the header of the audio file and "MAX FIT" for the body of the audio file. Thus, the recommended data blocks sizes for the entire file will be as follows (in sequence from header to end of file):
Block 1: 4 KB (Header),
Block 2: 128 KB,
Block 3: 128 KB,
Block 4: 16 KB,
Block 5: 4 KB, and
Block 6: 4 KB.

For the audio file, if the table 230 mentions recommended block sizes 4 KB for the header and "MIN FIT" for the body, the recommended storage blocks sizes for the entire file will be as follows (in sequence from header to end of file):
Block 1: 4 KB (Header),
Block 2: 128 KB,
Block 3: 128 KB, and
Block 4: 64 KB.

Block size recommendation may also be applied considering the properties of individual object as well. As an example, object size 233 based recommendation is shown in FIG. 8. For an audio file of extension MP3, if the file size is less than or equal to 100 KB, the recommended block size is 4 KB for header and 16 KB for body of the file. But if the file size is more than 100 KB, body of the file has a recommendation of "MAX FIT" block size.

Other properties for block size recommendation can be as follows: object read or write frequency, user provided priority level for individual object, etc.

Block size recommendation may also be applied for an entire category of files. There can also be global recommendations of block sizes for files that are not mentioned in the table 230.

Figure 9:
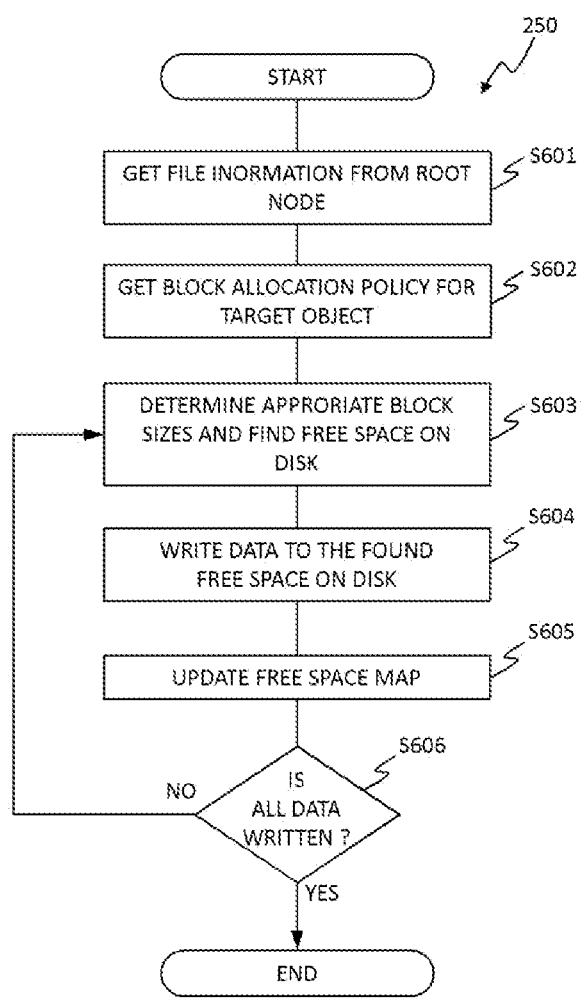
FIG. 9 is an example flow chart diagram for the blocks allocation program 250.

FIG. 9 is an example flow chart diagram for the blocks allocation program 250.

This program 250 allocates blocks in accordance with a block allocation policy and the availability of free space in storage disk 150.

At step S601, the program 250 reads root node 430 of the given object and gets miscellaneous object information including object type.

At step S602, the program 250 gets block allocation policy for the object type (e.g. object category and object extension) determined in step S601.

At step S603, the program 250 determines appropriate block size(s) for the data to be written. These block sizes can be determined in accordance with the block allocation policy determined in step S602, and the availability of free size blocks in the storage disks. For example, if the policy is to allocate the preset recommended blocks, the new block sizes for allocation can be the recommended block sizes read from table 230. However, if free blocks of the size of the recommendation are not available (see steps S604 and S605), the block sizes for allocation can be different from the recommended size and can be determined according to a different block allocation policy determined in step S602. The program 250 may find contiguous or non-contiguous free space depending on the block allocation policy. The program may use a free space bitmap to quickly determine available free space in the volume.

At step S604, the program 250 writes data to the found free space in blocks of sizes as determined in step S603. The program 250 updates nodes in the metadata in accordance with the found free space (the free blocks) where data is written, for example, at step S603 or S604. Specifically, the program 250 configures block pointers pointing to the free blocks in direct nodes.

At step S605, the program 250 updates free space bitmap, specifically changes each of bits corresponding to the newly written blocks to "1" (means "Filled").

At step S606, the program 250 checks whether all the data that was to be written has been written or not, if some data is left or more data should be written, the program 250 executes step S603, otherwise the program 250 terminates.

Figure 10:
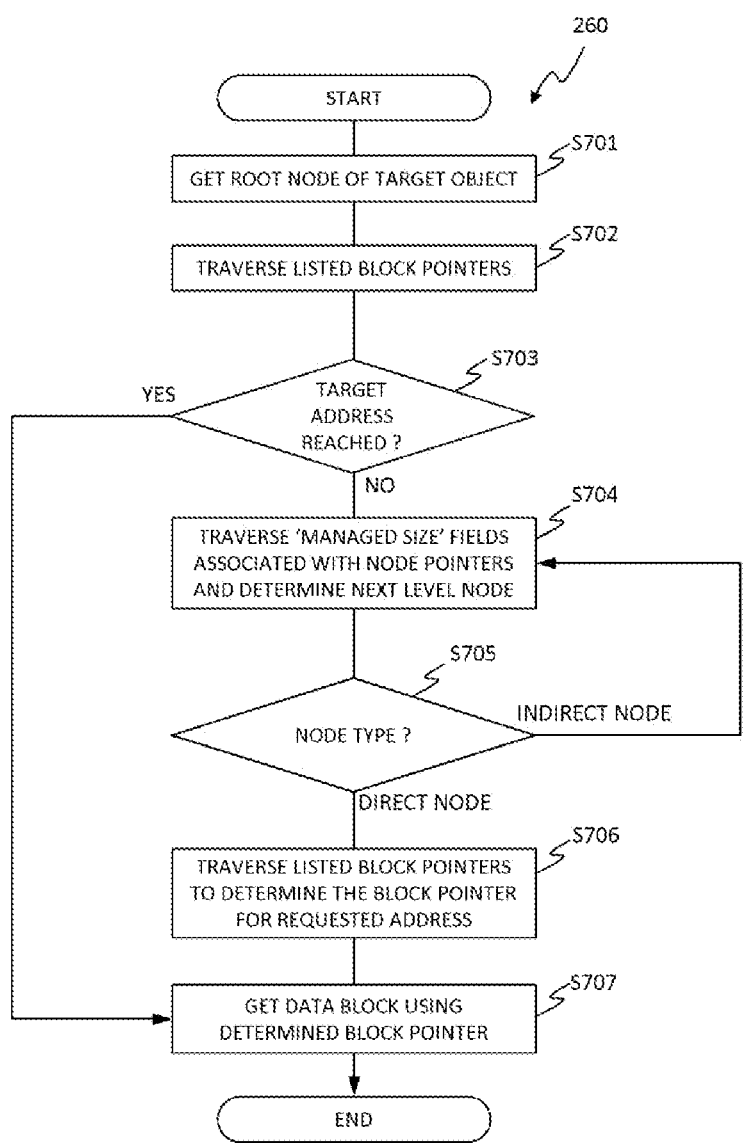
FIG. 10 is an example flow chart diagram for the block access program 260.

FIG. 10 is an example flow chart diagram for the block access program 260.

The program 260 is used to access a data block of a given logical address of an object. The size of data managed by a single direct or indirect node can vary depending on the size of the blocks pointed by the block pointers. Thus, this program 260 traverses the node tree and tracks the size of data pointed by each node, in order to determine the node as well as the final block pointer(s) that points to the data corresponding to the logical address of the object. In order to track the traversed size, the program 260 maintains a "cumulative managed size" variable, that is the sum of all the size related fields (managed sizes 412 and 422 and the block size determined by block size code 402) that are read sequentially while traversing the node tree.

In step S701, the program 260 reads from storage disk 150 the root node 430 of the given object and gets miscellaneous object information including object type.

In step S702, the program 260 traverses through the block pointers 401 one by one, mentioned in the root node 430, and by reading the block size code 402 for each block pointer entry. If the optional managed size 403 associated with the all the block pointers 401 is available, the program 260 can skip traversing through each block pointer 401 entry and can easily decide if the mentioned block pointers hold the pointer to requested logical address.

In step S703, the program 260 checks whether the root node traversal has reached to the requested address or not. If true, the program 260 executes step S707, otherwise the program 260 updates the cumulative managed size for all the traversed block pointers and executes step S704.

In step S704, the program 260 traverses the current node and reads one by one, the managed sizes 412 and 422 corresponding to the direct nodes 410 and indirect nodes 420 respectively, mentioned in the node. Further, the program 260 then determines whether the sum of cumulative managed size and the currently read managed size is greater than or equal to the target address. If false, the program 260 adds the currently read managed size to the cumulative managed size and repeats this step S704 for the managed size corresponding to next node pointer. In contrast, if true, the program 260 reads the node pointed by the node pointer corresponding to the currently read managed size, and moves to step S705.

In step S705, the program 260 checks the node type of the node read in step S704, and if it's a direct node 410, the program 260 executes step S706 of traversing the block pointers of direct node 410, otherwise (node is indirect node) the program 260 loops back to step S704 in order to traverse the chain of indirect nodes 420.

In step S706, the program 260 traverses through the block pointers 401 mentioned in the node and by reading the block size code 402 for each block pointer 401 in the node 410 in order to determine the block pointer for the target address.

In step S707, the program 260 reads the data block(s) from the block pointer(s) determined in earlier steps.

According to this embodiment, as blocks storing an object for each object, the computer system 100 can determine (choose) appropriate different sized blocks based on the size of the object as well as the object type thereof.

3. Second Embodiment

The second embodiment will be described below. In this regard, differences from the first embodiment will be mainly described, and points common to the first embodiment will not be described or simplified.

According to this embodiment, the computer system can decrease the amount of storage space required to manage data blocks, in other words, decrease the amount of the metadata. According to this embodiment, data blocks are managed using a combination of block pointers and extents. A large chunk of contiguous allocated blocks can be stored as an extent (address and length), thus saving a lot of storage space if compared to block pointers.

The block pointers and the extents are interchangeable as required. For example, when the processing unit (e.g. block allocation program) finds block pointers respectively pointing to contiguous blocks whose sizes are the same, the processing unit can change block pointers into one extent which points to the contiguous blocks. Consider an area of contiguous allocated blocks represented by an extent. If at some point in time some allocated blocks are eventually freed, the extent may entirely change into block pointers, or only part of the extent is changed to block pointers and the remaining extent is kept as one or more smaller extents.

Similarly if for block pointers, if a big chunk of contiguous blocks become allocated, the block pointers can be converted to an extent.

Figure 11:
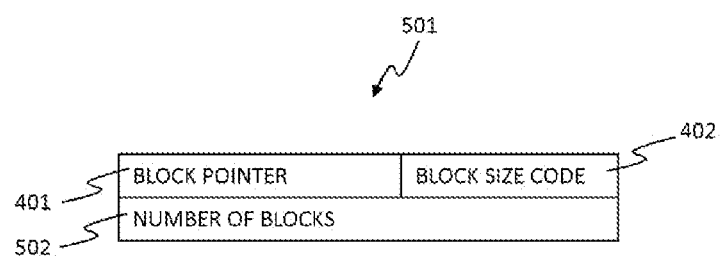
FIG. 11 shows an example structure of an extent 501 according to the second embodiment.

FIG. 11 shows an example structure of an extent 501.

The extent 501 includes fields for storing a block pointer 401, a corresponding block size code 402, and the number of blocks 502. The block pointer 401 points to the first block of the chunk of contiguous blocks addressed by the extent 501. The number of blocks 502 represents the number of contiguous blocks addressed by the extent 501, where the first block of the contiguous blocks is pointed by the block pointer 401 of the extent 501, and each of the contiguous blocks composing the chunk is the same size determined by the block size code 402 upon referring the table 220.

The total size (the managed size) that is pointed by an extent 501 can be calculated by multiplying the number of blocks 502 with the block size, where block size can be determined by the block size code 402.

Figure 12:
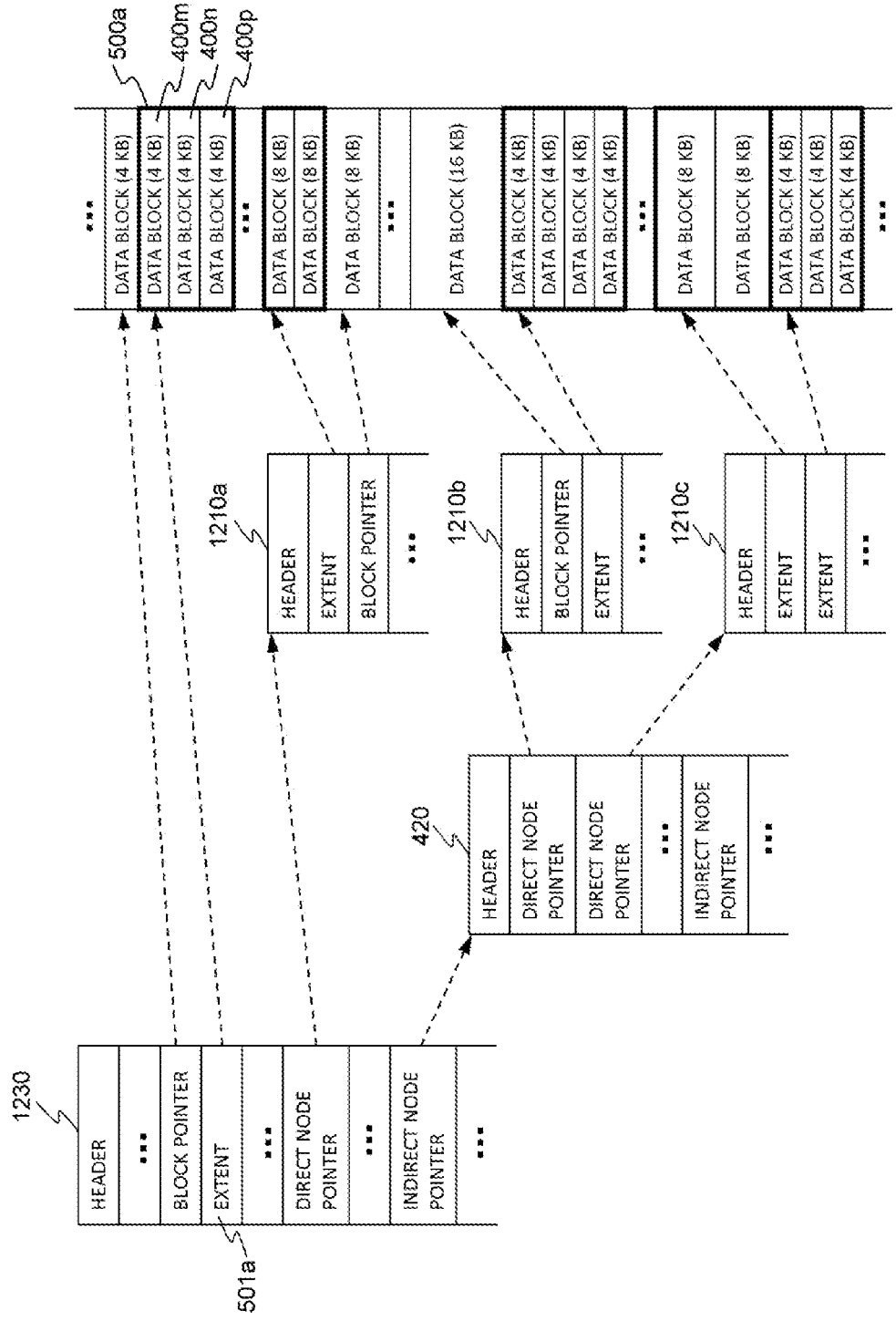
FIG. 12 is a schematic diagram of an example of node tree data structure according to the second embodiment.

FIG. 12 is a schematic diagram of an example of node tree data structure according to the second embodiment.

Similar to the node tree explained in FIG. 6, this node tree data structure is used for addressing data blocks of an object. However, in addition to block pointers 401, this node tree also uses extents 501 for pointing to one or plural contiguous blocks.

In this figure, for the sake of simplicity, the block size codes 402 and the managed sizes (403, 412 and 422) are not shown.

The root node 1230, direct node 1210, and the indirect node 1220 may be the same as explained in FIG. 6, except that root node 430 and direct node 410 also use extents 501 for pointing to a contiguous plurality of blocks 500.

For example, the extent 501a in the root node 1230 is pointing to a chunk 500a consisting of contiguous blocks 400m, 400n and 400p, where each of the blocks is 4 KB in size.

In this embodiment, the processing unit (e.g. the block allocation program) determines a block pointer 401 as a pointer entry (which is a block pointer 401 or an extent 501) as for each of blocks 400 which are not contiguous blocks 400 in the different sized blocks 400 for storing the target object. In contrast, the processing unit determines an extent 501 as a pointer entry as for blocks 400 which are contiguous blocks 400 in the different sized blocks.

In this embodiment, data block for a given logical address can be accessed by a program similar to the program 260 explained in FIG. 10, except for the following changes in the program 260.

(1) In this embodiment, in step S702 and in step S706, the program also traverses each listed extent 501, and calculates managed size for each extent, and use it for tracking the requested data block address.

(2) If it is determined that the requested data block is available in a chunk of contiguous data blocks pointed to by an extent, in step S707 the program calculates the target block address for the requested logical address.

According to this embodiment, the computer system can further decrease the amount of the metadata while keeping determining appropriate different sized blocks based on the size of the object.

4. Third Embodiment

The third embodiment will be described below. In this regard, differences from the first and second embodiments will be mainly described, and points common to the first and second embodiments will not be described or simplified.

Conventionally blocks are marked free using the free space bitmap (hole map). However, for a huge amount of storage disk, the free space bitmap itself becomes huge. In order to shorten the space required to store free space allocation status, in this embodiment, extents are used in collaboration with free space bitmap. For large chunks of contiguous free blocks where all the bits of a bitmap may be "0", an extent 560 may be used instead of bitmap entry 550. Thus, the bitmaps 550 may be used for areas of the storage disk 150 where distribution of the free blocks and the allocated blocks is mixed and random, while the extents 560 are used for large chunks of contiguous free blocks. Also, a chunk of contiguous allocated blocks may neither be mentioned in the bitmap 550 nor in extent 560 and it is understood that those block are allocated.

The bitmap entry 550 and the extents 560 are interchangeable as required. Consider an area of contiguous free blocks represented by an extent 560. If at some point in time some free blocks are eventually allocated, the extent 560 may entirely change into a bitmap entry 550, or only part of the extent 560 is changed to a bitmap entry 560 and the remaining extent 560 is kept as a smaller extent 560.

Similarly if for a bitmap entry 550 either all of blocks or a big chunk of contiguous blocks become free, the bitmap entry 550 can be converted to an extent or it can be divided in at least one extent and a bitmap entry as well.

The free space management program analyses the free block distribution across the storage disk 150 and generates free space bitmap entries 550 and free space extents 560. An example of free space bitmap entry 550 is explained using FIG. 13, and an example of free space extent 560 is explained using FIG. 14.

Figure 15:
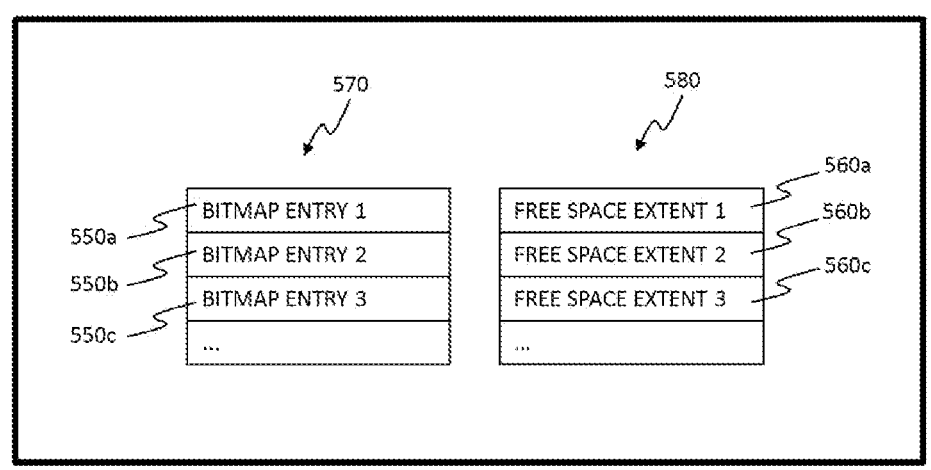
FIG. 15 shows an example of two separate lists used for free block management.
Figure 16:
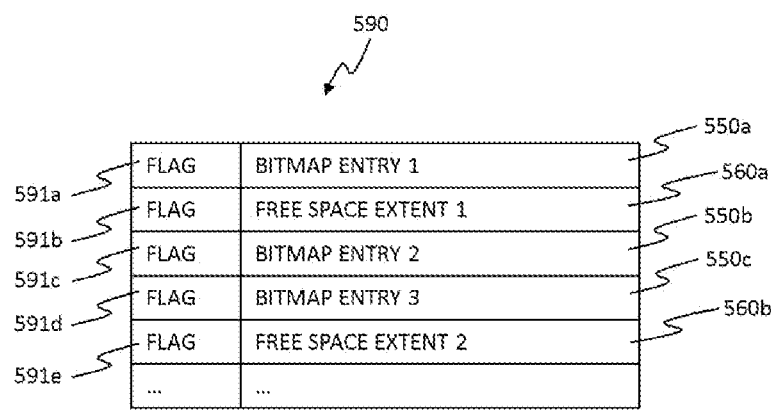
FIG. 16 shows an example of a list 590 used for free block management.

In one example, as shown in FIG. 15, the bitmap entries 550 and extents 560 are stored in separate lists (570 and 580) respectively as the free block management table 290. In another example, as shown in FIG. 16, the bitmap entries 550 and extents 560 may be stored in a single list 590 as the free block management table 290. The bitmap entries 550 and the extents 560 can appear one after the other. Other methods to store a combination of bitmap entries 550 and extents 560 are also possible.

Figure 13:
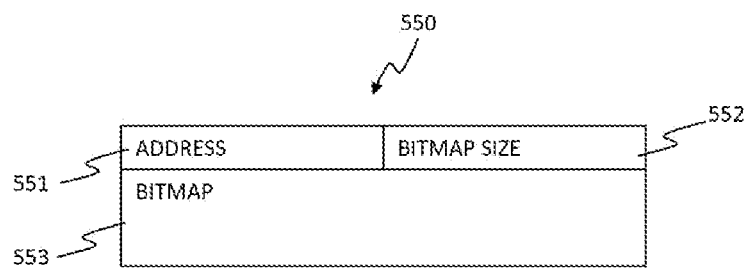
FIG. 13 shows an example data structure of a free space bitmap entry 550 according to the third embodiment.

FIG. 13 shows an example data structure of a free space bitmap entry 550.

This bitmap entry 550 includes fields for storing an address 551, a bitmap size 552 and a bitmap 553. The address 551 represents the address of the first block starting from which the free space bitmap is kept. The bitmap size 552 represents the length of the bitmap 553. The length may be the number of blocks for which the bitmap 553 is provided, or the physical size on disk of the bitmap 553. For example, if the bitmap 553 is provided for 128 blocks starting from address "0", the bitmap size can be "128" (because of 128 blocks) or "16" (because it takes 16 bytes to store 128 bits, when 1 bit per block is used to store free status).

Figure 14:
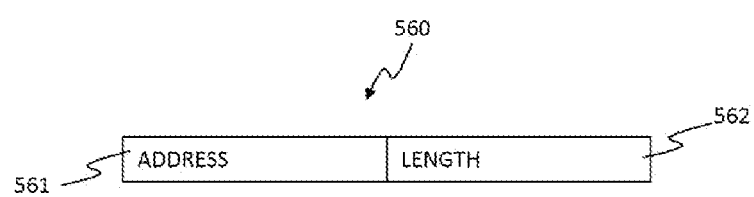
FIG. 14 shows an example data structure of a free space extent 560.

FIG. 14 shows an example data structure of a free space extent 560.

This free space extent 560 includes fields for storing an address 561 and a length 562. The address 561 represents the address of the first block starting from which the free space extent is kept. The length 562 represents the number of contiguous free blocks. The contiguous free blocks whose sized can be the same.

FIG. 15 shows an example of two separate lists used for free block management.

A list 570 is a list of bitmap entries 550, and a list 580 is a list of free space extents 560.

FIG. 16 shows an example of a list 590 used for free block management.

The list 590 includes fields for storing bitmap entries 550 (information stored in the bitmap entries 550), space extents 560 and flags 591. The list 590 uses a flag 591 with each of its entry 550 or extent 560. The flag 591 is used to differentiate between the bitmap entry 550 and the free space extent 560, mentioned in the list 590. For example, the flag 590 in the list can be one bit field and a value "0" may represent bitmap entry 550, and a value "1" may represent free space extent 560.

According to this embodiment, the computer system can further decrease the amount of the metadata while keeping choosing appropriate determine different sized blocks based on the object size.

5. Forth Embodiment

The forth embodiment will be described below. In this regard, differences from the first to third embodiments will be mainly described, and points common to the first to third embodiments will not be described or simplified.

Figure 17:
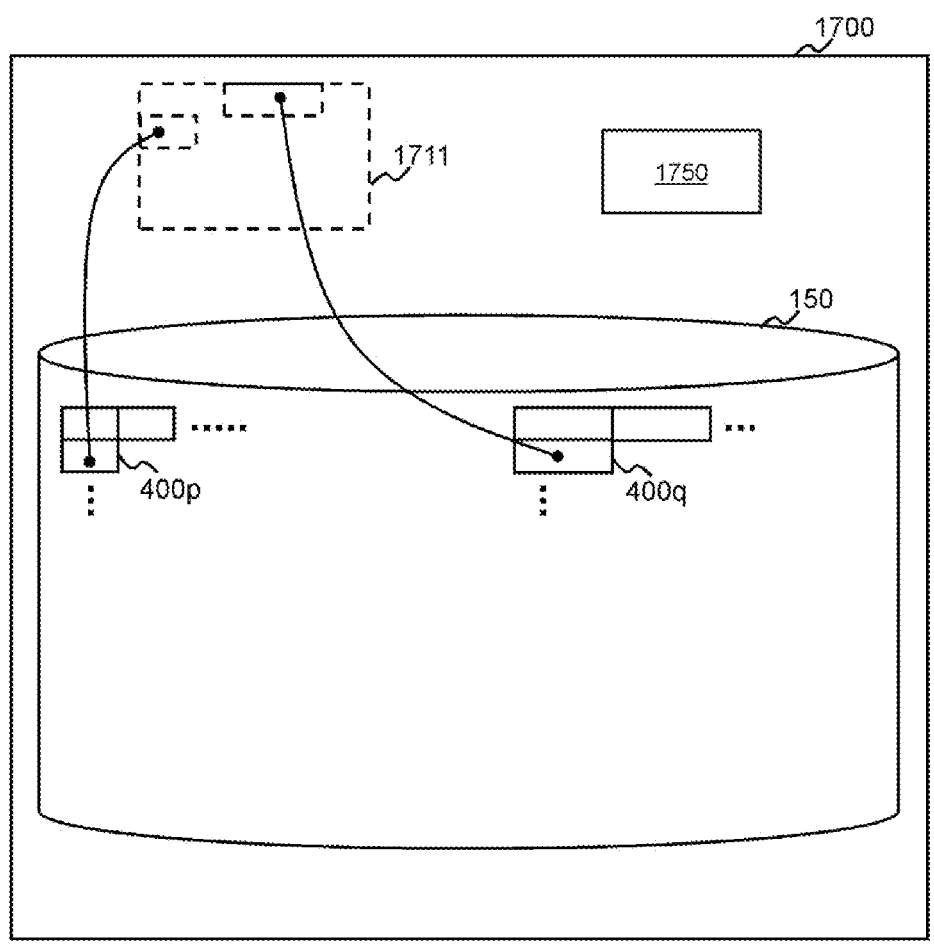
FIG. 17 shows an example of a relationship between virtual blocks and actual blocks according to the forth embodiment.

FIG. 17 shows an example of a relationship between virtual blocks and actual blocks according to the forth embodiment.

The computer system 1700 according to this embodiment is a computer system which Thin Provisioning (also referred to as Dynamic Provisioning) is applied. The processing unit of the computer system 1700 is configured to provide a virtual logical volume (hereinafter referred to as a virtual volume) 1711 to a computer (e.g. host computer). Furthermore, the storage disk 150 including blocks 400 can be a pool including actual blocks which are allocable to virtual blocks in the virtual volume 1711. That is, blocks 400 can be actual blocks in the pool.

When any block 400 is not allocated to a write destination area (address) in the virtual volume 1711, the processing unit allocates blocks 400 to the area. In this figure, a small sized block 400p and a large sized block 400q are allocated to the virtual volume 1711.

The computer system 1700 manages metadata including mapping information 1750. The mapping information 1750 represents a relationship between virtual addresses of the virtual volume 1711 and physical addresses of the allocated blocks 400. The processing unit (e.g. block access program) identifies an access destination physical address corresponding to an access destination virtual address (for example, which is designated in a request received from a host computer) by referring the mapping information, and finds the access destination blocks 400 based on the identified physical address and the nodes pointing to blocks 400.

According to this embodiment, the computer system can choose appropriate different sized blocks which are allocated to the virtual volume 1711 based on the size of the object, while keeping the amount of required metadata less. That is because it is possible to decrease the amount of the mapping information 1750.

6. Additional Note

The present invention can also be realized by a program code of software for realizing the functions of the embodiments. In this case, a storage medium having recorded therein the program code is provided to a system or an apparatus and a computer (or a CPU or an MPU) of the system or the apparatus reads out the program code stored in the storage medium. In this case, the program code itself read out from the storage medium realizes the functions of the embodiments explained above. The program code itself and the storage medium having the program code stored therein configure the present invention. As the storage medium for supplying such a program code, for example, a flexible disk, a CD-ROM, a DVD-ROM, a hard disk, an optical disk, a magneto-optical disk, a CD-R, a magnetic tape, a nonvolatile memory card, or a ROM is used.

Moreover, it is also possible that the program code of the software for realizing the functions of the embodiments is delivered via a network, whereby the program code is stored in storing means such as a hard disk or a memory of a system or an apparatus or a storage medium such as a CD-RW or a CD-R and, when the program code is used, a computer (or a CPU or an MPU) of the system or the apparatus reads out and executes the program code stored in the storing means or the storage medium.

Lastly, it is necessary to understand that the process and the technique explained above are not essentially related to any specific apparatus and can be implemented by any appropriate combination of components. Further, it is possible to use general-purpose devices of various types according to the teaching explained above. It may be seen that it is useful to build a dedicated apparatus to execute the steps of the method explained above. Various inventions can be formed by an appropriate combination of the plural components disclosed in the embodiments. For example, several components may be deleted from all the components explained in the embodiments. Further, the components explained in the different embodiments may be combined as appropriate. The present invention is described in relation to the specific examples. However, the specific examples are for explanation and are not for limitation in every aspect. It would be understood by those skilled in the art that there are a large number of combinations of hardware, software, and firmware suitable for carrying out the present invention. For example, the software explained above can be implemented in a program or a script language in a wide range such as assembler, C/C++, perl, Shell, PHP, etc.

Further, in the embodiments, control lines and information lines considered necessary in explanation are shown. Not all control lines and information lines are shown in terms of a product. All components may be coupled to one another.

In addition, other implementations of the present invention would be made apparent for those having ordinary knowledge in the technical field from the examination of the specification and the embodiments of the present invention disclosed herein. The various forms and/or components of the explained embodiments can be used independently or in any combination in a computerized storage system having a function of managing data. The specification and the specific examples are merely typical ones. The scope and the spirit of the present invention are indicated by the following claims.

REFERENCE SIGN LIST

100: Computer system

The invention claimed is:

1. A computer system for improving efficiency of data storage and retrieval, the computer system comprising:
   a storage unit that includes a plurality of storage blocks, wherein the plurality of storage blocks includes blocks different of sizes;
   a memory comprising a cache, a free space bitmap, and a metadata management system;
      wherein the cache stores metadata that is associated with data objects that are stored in the plurality of storage blocks, wherein data objects stored in the storage unit are managed based on the metadata and an amount of metadata stored in the memory varies according to a number of blocks in which a respective data object is stored; and
      wherein a data allocation policy is retrieved from the metadata management system; and
   a processor that is communicatively coupled to the memory and the storage unit, wherein the processor is configured to:
      receive a file,
      determine a content category of the file,
      retrieve the data allocation policy for the file to obtain a header block size and a block size strategy for the content category determined, wherein the data allocation policy includes the header block size and the block size strategy,
      store the file in one or more storage blocks of the plurality of storage blocks according to the data allocation policy determined, and
      update the metadata for the file based on the one or more storage blocks where the file is stored.

2. The computer system according to claim 1, wherein the metadata comprises a pointer to the one or more storage blocks.

3. The computer system according to claim 1, wherein the block size strategy includes at least one of:
   a fixed block size strategy where a block size for allocation is a predetermined number,
   a Min Fit strategy where the block size for allocation is chosen as a smallest block size that is equal to or greater than an unallocated remaining size of the file, and
   a Max Fit strategy where the block size for allocation is chosen as a largest possible block which is smaller than the unallocated remaining size of the file.

4. The computer system according to claim 3, wherein the block size strategy includes the Min Fit strategy.

5. The computer system according to claim 3, wherein the block size strategy includes the Max Fit strategy.

6. The computer system according to claim 3, wherein the block size strategy includes the fixed block size strategy.

7. A method for improving efficiency of data storage and retrieval, the method comprising:
   providing a storage device that includes a plurality of storage blocks, wherein the plurality of storage blocks includes blocks different of sizes;
   providing a memory comprising a cache, a free space bitmap, and a metadata management system;
      wherein the cache stores metadata that is associated with data objects that are stored in the plurality of storage blocks, wherein data objects stored in the storage device are managed based on the metadata and an amount of metadata stored in the memory varies according to a number of blocks in which a respective data object is stored; and
      wherein a data allocation policy is retrieved from the metadata management system; and
   receiving, by a processor, a file which is a write target;
   determining, by the processor, a content category of the file;
   retrieving, by the processor, a data allocation policy for the file to obtain a header block size and a block size strategy for the content category determined, wherein the data allocation policy includes the header block size and the block size strategy,
   storing, by the processor, the file in one or more storage blocks of the plurality of storage blocks in the storage device according to the data allocation policy; and
   updating metadata for the file based on the one or more storage blocks where the file is stored, wherein data objects stored in the storage device are managed based on the metadata and an amount of metadata associated with a respective object varies according to a number of blocks in which a respective data object is stored.

8. A non-transitory computer readable medium for improving efficiency of data storage and retrieval storing instructions that when executed by a processor cause the processor to:
   receive a file which is a write target;
   determine a content category of the file;
   retrieve a data allocation policy for the file to obtain a header block size and a block size strategy for the content category determined, wherein the data allocation policy includes the header block size and the block size strategy;
   store the file in one or more storage blocks of a plurality of storage blocks in a storage device according to the data allocation policy;
   access a memory comprising a cache, a free space bitmap, and a metadata management system;
      wherein the cache stores metadata that is associated with data objects that are stored in the plurality of storage blocks, wherein the data objects stored in the storage device are managed based on the metadata and an amount of metadata stored in the memory varies according to a number of blocks in which a respective data object is stored; and
      wherein a data allocation policy is retrieved from the metadata management system; and
   and
   update metadata for the file based on the one or more storage blocks where the file is stored, wherein data objects stored in the storage device are managed based on the metadata and an amount of metadata associated with a respective object varies according to a number of blocks in which a respective data object is stored.

9. The method of claim 7, wherein the metadata includes a pointer that points to the one or more storage blocks that store the file.

10. The method of claim 7, wherein the block size strategy includes at least one of:
- a fixed block size strategy where a block size for allocation is a predetermined number,
- a Min Fit strategy where the block size for allocation is chosen as a smallest block size that is equal to or greater than an unallocated remaining size of the file, and
- a Max Fit strategy where the block size for allocation is chosen as a largest possible block which is smaller than the unallocated remaining size of the file.

11. The non-transitory computer readable medium of claim 8, wherein the metadata includes a pointer that points to the one or more storage blocks that store the file.

12. The non-transitory computer readable medium of claim 8, wherein the block size strategy includes at least one of:
- a fixed block size strategy where a block size for allocation is a predetermined number,
- a Min Fit strategy where the block size for allocation is chosen as a smallest block size that is equal to or greater than an unallocated remaining size of the file, and
- a Max Fit strategy where the block size for allocation is chosen as a largest possible block which is smaller than the unallocated remaining size of the file.

13. The computer system according to claim 1, wherein the category of the file is an audio file, a video file or a picture file.

14. The method of claim 7, wherein the category of the file is an audio file, a video file or a picture file.

15. The non-transitory computer readable medium of claim 8, wherein the category of the file is an audio file, a video file or a picture file.

* * * * *